UNITED STATES PATENT OFFICE.

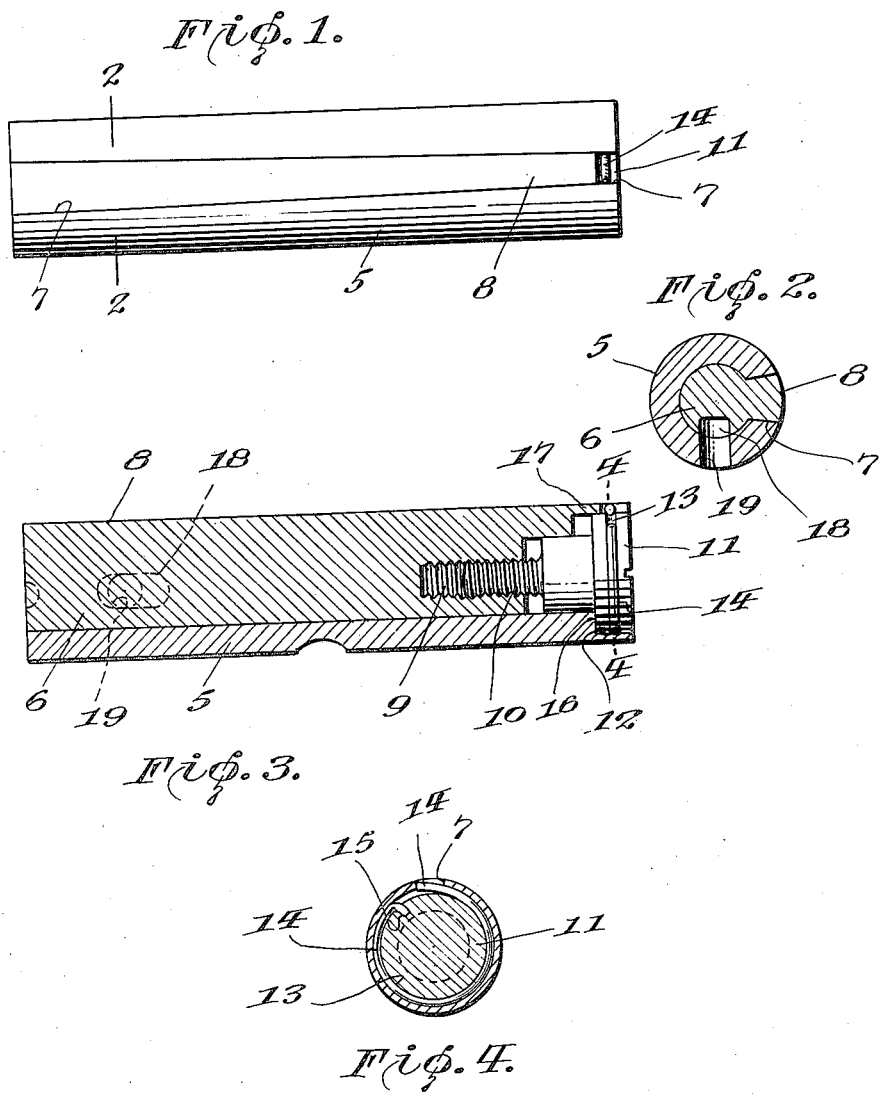

CHARLES HENRY CLEMONS, OF WELDON, ILLINOIS.

WRIST-PIN.

1,395,946.

Specification of Letters Patent.

Patented Nov. 1, 1921.

Application filed May 11, 1921. Serial No. 468,776.

*To all whom it may concern:*

Be it known that I, CHARLES H. CLEMONS, a citizen of the United States, residing at Weldon, in the county of De Witt and State of Illinois, have invented new and useful Improvements in Wrist-Pins, of which the following is a specification.

This invention relates to wrist pins employed for attaching connecting rods to pistons, and its object is to produce a wrist pin which can be readily adjusted to compensate for wear, without removal from the piston.

The object stated is attained by means of a novel combination and arrangement of parts to be hereinafter described and claimed, and in order that the same may be better understood, reference is had to the accompanying drawing, forming a part of this specification.

In the drawing,

Figure 1 is an elevation of the device;

Fig. 2 is a cross-section on the line 2—2 of Fig. 1;

Fig. 3 is a central longitudinal section, and

Fig. 4 is a cross-section on the line 4—4 of Fig. 3.

Referring specifically to the drawing 5 denotes a wrist pin which is tubular so that it may seat a cylindrical core 6. In the side of the wrist pin is a slot 7 which opens into the bore thereof, so that the pin is split longitudinally. In the slot 7 seats a rib 8 formed on the side of the core and extending in the direction of the length thereof. The slot 7 extends throughout the entire length of the pin 5 and it is tapered toward one end, the rib 8 being correspondingly tapered so that it is wedge-shaped.

The pin 5 is resilient to a degree sufficient to enable it to be expanded when wear occurs so that it may again accurately fit the bearing bosses of the piston or the bushings lining the same. This expansion of the pin is effected by drawing the core 6 in the direction of the length of the pin to advance the rib 8 along the slot 7 in a direction to act as a wedge to spread the same. As the wear is usually comparatively slight, a slight movement of the core is sufficient to take up the same.

The following means are provided for operating the core 6 for the purpose stated:

The end of the core 6 at the smaller end of the rib 8 has a tapped central aperture 9 to seat an adjusting screw 10 having a flat head 11 which is kerfed for application of a screw driver. The bore of the pin 5 is enlarged at one end sufficiently as shown at 12, to seat the head 11, and in the edge of the latter is a groove 13 to seat a locking device for the screw. This device is a split resilient ring 14 having one end bent inwardly and inserted into a recess 15 in the bottom of the groove 13. The other end of the ring projects slightly from the groove 13 so that it may snap into the slot 7 when it comes opposite the latter, and thereby hold the screw from turning in a direction to back and allow the core 6 to move in a direction to retract the rib 7. However, the projecting end of the ring yields when the screw is turned in a direction to advance the rib to spread the pin 5. The head 11 of the screw abuts against the shoulder 16 produced by the enlarged end portion 12 of the bore of the pin in which said head seats.

The rib 8 projects for a short distance from that end of the core 6 into which the screw 10 is threaded and its extremity is reduced in thickness as shown at 17 to correspond to the thickness of the wall of the pin 5 at the enlarged portion 12 of its bore, so that the core may be advanced to its utmost limit without the projecting portion of the rib interfering with the screw by abutting against its head 11.

The core 6 has a longitudinal side recess 18 near one end to allow its adjustment in the pin 5 without drawing on the cap screw that is sometimes used to hold the pin in the piston, and which passes through a side aperture 19 in the pin, said aperture registering with the recess.

If the wedge rib 8 does not expand the pin 5 sufficiently to take up wear, a brass shim may be placed on one side of the rib.

I claim:

1. A wrist pin comprising a tubular body having a side slot extending throughout its entire length, whereby the body is split longitudinally to permit expansion, said slot being tapered in the direction of one of its ends, a core slidably mounted in said body and having a wedge-shaped rib seating in the slot, and adjusting means for said core.

2. A wrist pin comprising a tubular body having a side slot extending throughout its entire length, whereby the body is split longitudinally to permit expansion, said slot being tapered in the direction of one of its ends, a core slidably mounted in said body and having a wedge-shaped rib seating in the slot, and an adjusting screw for the core carried by the body, said screw being threaded into one end of the core.

3. A wrist pin comprising a tubular body which is split longitudinally to permit expansion, a core slidably mounted in said body and having a wedge-shaped rib seating in the split thereof, an adjusting screw threaded into one end of the core and carried by the body, and means for locking said screw against rotation in one direction.

4. A wrist pin comprising a tubular body which is split longitudinally to permit expansion, a core slidably mounted in said body and having a wedge-shaped rib seating in the split thereof, and an adjusting screw seating in the body and threaded into one end of the core, said body having an internal shoulder against which the head of the screw abuts.

5. A wrist pin comprising a tubular and expansible body which is split longitudinally throughout its entire length, a member slidably mounted in said body and having a wedge coextensive with and seating in the split for expanding the body, and adjusting means for said member.

In testimony whereof I affix my signature.

CHARLES HENRY CLEMONS.